(12) United States Patent  
Baelde et al.

(10) Patent No.: US 11,956,616 B2  
(45) Date of Patent: Apr. 9, 2024

(54) APPARATUS AND METHOD FOR AUDIO ANALYSIS

(71) Applicant: STEELSERIES FRANCE, Villeneuve d'Ascq (FR)

(72) Inventors: Maxime Baelde, Lille (FR); Nathan Souviraa-Labastie, Mons en Baroeul (FR); Raphaël Greff, Lille (FR)

(73) Assignee: STEELSERIES FRANCE, Villeneuve d'Ascq (FR)

( * ) Notice: Subject to any disclaimer, the term of this patent is extended or adjusted under 35 U.S.C. 154(b) by 262 days.

(21) Appl. No.: 17/434,530

(22) PCT Filed: Mar. 2, 2020

(86) PCT No.: PCT/EP2020/055474  
§ 371 (c)(1),  
(2) Date: Aug. 27, 2021

(87) PCT Pub. No.: WO2020/178256  
PCT Pub. Date: Sep. 10, 2020

(65) Prior Publication Data  
US 2022/0141609 A1 May 5, 2022

(30) Foreign Application Priority Data  
Mar. 4, 2019 (EP) ...................... 19305251

(51) Int. Cl.  
*H04S 7/00* (2006.01)  
*H04S 3/00* (2006.01)

(52) U.S. Cl.  
CPC ............... *H04S 7/30* (2013.01); *H04S 3/008* (2013.01); *H04S 7/40* (2013.01); *H04S 2400/01* (2013.01);  
(Continued)

(58) Field of Classification Search  
CPC ... H04S 7/30; H04S 7/40; H04S 3/008; H04S 2400/01; H04S 2400/11; H04S 2400/13  
(Continued)

(56) References Cited

U.S. PATENT DOCUMENTS

2011/0081024 A1* 4/2011 Soulodre ................ H04S 7/30  
381/17  
2017/0083280 A1* 3/2017 Yu ......................... G06F 3/167

FOREIGN PATENT DOCUMENTS

EP 2486737 A1 8/2012  
EP 3147895 A1 3/2017  
(Continued)

OTHER PUBLICATIONS

Tom Barker, et al., "Blind Separation of Audio Mixtures Through Nonnegative Tensor Factorisation of Modulation Spectograms", Journal of Latex Class Files, vol. 13, No. 9, Sep. 2014.  
(Continued)

*Primary Examiner* — William A Jerez Lora  
(74) *Attorney, Agent, or Firm* — Thomas | Horstemeyer, LLP

(57) ABSTRACT

An apparatus comprises a receiver (201) receiving a multi-channel audio signal representing audio for a scene. An extractor (203) extracts at least one directional audio component by applying a spatial filtering to the multi-channel signal where the spatial filtering is dependent on the multi-channel audio signal. A feature processor (205) determines a set of features for the first directional audio component and a categorizer (207) determines a first audio source category out of a plurality of audio source categories for the directional audio signal in response to the set of features. An assigner (209) assigns a first audio source property to the first directional audio component from a set of audio source properties for the first audio source category. The apparatus may provide very advantageous categorization and charac-  
(Continued)

terization of individual audio sources/components present in a multi-channel signal. This may be advantageous e.g. for visualization of audio events.

13 Claims, 6 Drawing Sheets

(52) U.S. Cl.
CPC ....... *H04S 2400/11* (2013.01); *H04S 2400/13* (2013.01)

(58) Field of Classification Search
USPC .......................................... 381/56, 303, 306
See application file for complete search history.

(56) References Cited

FOREIGN PATENT DOCUMENTS

| | | |
|---|---|---|
| EP | 3297298 A1 | 3/2018 |
| WO | 2010075634 A1 | 7/2010 |
| WO | 2011044064 A1 | 4/2011 |

OTHER PUBLICATIONS

Extended Search Report in co-pending related EP Application No. 19305251.1, dated Jun. 5, 2019.
International Search Report in co-pending related PCT Application No. PCT/EP2020/055474, dated Apr. 23, 2020.

* cited by examiner

APPARATUS AND METHOD FOR AUDIO ANALYSIS

CROSS REFERENCE TO RELATED APPLICATIONS

This application is the 35 U.S.C. § 371 national stage application of PCT Application No. PCT/EP2020/055474, filed Mar. 2, 2020, which application claims the benefit of European Application No. EP 19305251.1, filed Mar. 4, 2019, both of which are hereby incorporated by reference herein in their entireties.

FIELD OF THE INVENTION

The invention relates to an apparatus and method for audio analysis, and in particular, but not exclusively, to categorizing audio components for e.g. video game applications.

BACKGROUND OF THE INVENTION

Audio applications and services have become increasingly complex and varied in recent decades and in particular the provision of a diverse range of different spatial audio applications and experiences has become commonplace.

In many audiovisual experiences and applications, the audio perception has become increasingly important and may in many situations be considered as important (or indeed even more important) than the visual perception. For example, in video game applications, and especially in games such as first-person shooter (FPS) games, the user must use both the visual and auditory senses and perceptions to locate enemies, identify objects, detect explosions etc. The audio scene conveys a lot of information (such as the direction to different sound sources) which is useful to accurately localize characters and objects in the game. Multi-channel audio allows a spatial audio representation which can provide a more immersive experience to the user. However, in many practical scenarios the user may not have access to a multi-channel rendering system but is limited to rendering of only one or two channels (e.g. via a single speaker or a stereo setup, such as via headphones) resulting in the spatial audio information being at least partially lost.

In some cases, characteristics of elements of audio may be represented visually. For example, a sound event visualization system has been described in WO2010/075634A1. This approach may display visual information such as icons representing different types of sound. However, the amount of information presented tends to be limited and it would be beneficial to enhance this information to provide more information or to provide more accurate or reliable information.

Applications such as the abovementioned sound event visualization system benefits from being provided with information characterizing the audio elements and specifically by being provided with information of sound sources associated with the individual sound elements. However, such information is particularly difficult to derive from an audio signal in which the different sound elements and audio sources are combined into a single set of signals/channels. A number of algorithms have been proposed for deriving suitable information but these tend to be suboptimal and to not provide as much data or as accurate data as would be desired.

Hence, an improved approach would be advantageous, and in particular, an approach that allows improved operation, improved reliability, increased flexibility, facilitated implementation, facilitated operation, improved resource utilization, improved, additional and/or more accurate analysis and characterization of audio elements and/or associated audio sources, and/or improved performance would be advantageous.

SUMMARY OF THE INVENTION

Accordingly, the Invention seeks to preferably mitigate, alleviate or eliminate one or more of the abovementioned disadvantages singly or in any combination.

According to an aspect of the invention, there is provided an apparatus comprising: a receiver for receiving a multi-channel audio signal representing audio for a scene; an extractor for extracting at least a first directional audio component by applying a spatial filtering to the multi-channel signal, the spatial filtering being dependent on the multi-channel audio signal; a feature processor for determining a set of features for the first directional audio component; a categorizer for determining a first audio source category out of a plurality of audio source categories for the first directional audio component in response to the set of features, each audio source category of the plurality of audio source categories being linked to a set of one or more audio source properties; and an assigner for assigning a first audio source property to the first directional audio component from a set of one or more audio source properties linked to the first audio source category; wherein the extractor comprises: a divider for dividing audio channel signals of the multi-channel audio signal into a plurality of frequency interval signal components; a direction estimator for determining a direction for each frequency interval signal component of the plurality of frequency interval signal components; a grouper grouping frequency interval signal components into groups in response to the directions for each frequency interval signal component; and a generator for generating a directional audio component by combining the frequency interval signal components of a group of frequency interval signal components.

The invention may provide an improved user experience for many audio based applications. The approach may in many scenarios provide improved audio categorization of individual audio sources in an audio scene represented by a multi-channel signal. The invention may provide improved characterization of individual audio components estimated to correspond to specific audio sources in an audio scene/multi-channel signal.

The approach may in many scenarios and embodiments provide improved audio analysis and may provide improved and/or additional information. In many embodiments, a more accurate and/or reliable audio information may be provided.

The approach may in particular provide advantageous audio characterization suitable for e.g. visualization of audio events in e.g. a first person perspective game.

The approach may in many embodiments provide reliable, accurate, and/or low complexity characterization of audio components.

The spatial filtering may be dependent on the audio properties/content of the multi-channel signal. The spatial filtering may generate the first directional audio component to correspond to a beamformed audio component extracted by applying a beam in a direction determined in response to the multi-channel signal. The spatial filtering may generate the first directional audio component to correspond to audio in the multi-channel signal in a beam formed in a direction determined in response to the multi-channel signal. The direction may be in a direction of an increased audio level and may specifically be in a direction of a local or global maxima of the audio level as a function of the direction.

In many embodiments, the directions may be angular directions and may specifically be azimuth and/or elevation directions.

The audio source may be a specific source in the scene, such as an object generating sound. Thus, in some embodiments, one or more audio source categories may be a category associated/linked with an object or (at least semi) permanent audio source. However, an audio source may also be a specific temporal cause for a sound and may be an event or activity that produces the sound.

Specifically, a source for a sound may be a specific audio or sound event. Thus, the term audio source includes the term audio event. In some embodiments, one or more of the categories may be a category associated/linked with an audio event. One or more of the audio source categories may be an audio event category.

Each of the audio source categories may represent a specific audio source type/class/category. Each audio source category may be linked with a set of one or more audio source properties that are representative of audio sources belonging to that category. The set of audio source properties may comprise a label or descriptor for the audio source category. The label or descriptor may be a semantic description. In some embodiments, the label or descriptor may simply be an identifier for the audio source category, such as a category number.

The first audio source property may specifically be an indication of the first audio source category itself, such as an identification or e.g. the label or descriptor of the first audio source category itself.

The categorizer may be arranged to determine the first audio source category as a category associated with features that most closely match the features of the first directional audio component in accordance with any suitable criterion or algorithm. In some embodiments, the categorizer may perform a classification process based on machine learning.

The categorizer may be arranged to determine the first audio source category out of the plurality of audio source categories for the first directional audio component in response to the set of features in comparison with sets of features for each audio source category of the plurality of audio source categories.

The set of features may be a set of properties of the first directional audio component.

A category may be defined by a match criterion for the features of an audio component whereby the audio component belongs to the category if the features meet the match criterion.

The audio source properties (specifically linked to the categories) may also be referred to as audio source category properties.

The extractor comprises: a divider for dividing audio channel signals of the multi-channel audio signal into a plurality of frequency interval signal components; a direction estimator for determining a direction for each frequency interval signal component of the plurality of frequency interval signal components; a grouper grouping frequency interval signal components into groups in response to the directions for each frequency interval signal component; and a generator for generating a directional audio component by combining the frequency interval signal components of a group of frequency interval signal components.

The spatial filtering may thus be by dividing audio channel signals of the multi-channel audio signal into a plurality of frequency interval signal components; determining a direction for each frequency interval signal component of the plurality of frequency interval signal components; grouping frequency interval signal components into groups in response to the directions for each frequency interval signal component; and generating a directional audio component by combining the frequency interval signal components of a group of frequency interval signal components.

This may provide a particularly advantageous approach for determining directional audio components suitable for categorization.

The divider may typically be arranged to also perform temporal division, and specifically the divider may perform time slot based operation. Thus, the divider may be arranged to divide audio channel signals of the multi-channel audio signal into a plurality of time (interval and) frequency interval signal components. Such time-frequency interval signal components are often referred to as time-frequency tiles.

The grouper may be arranged to cluster frequency interval signal components into groups/clusters in response to the directions for each frequency interval signal component.

According to an optional feature of the invention, the apparatus further comprises an image generator for generating an image of the scene; and wherein the image generator is arranged to include a graphic element in the image, the graphic element being dependent on the first audio source property.

The image generator may specifically be arranged to generate the image in response to received visual data (e.g. video or image data) representing visual properties of the scene. An audiovisual signal representing a scene may be received with the audiovisual signal comprising the multi-channel signal describing the audio scene and a visual signal describing the visual scene. The image generator may generate the image based on the visual signal and add the graphic element to this image. The graphic element may specifically be an overlay graphic element for overlaying an image of the scene.

In some embodiments, the image generator may generate an image of the scene and overlay the image by an overlay graphic element, the graphic element being dependent on the first audio source property.

According to an optional feature of the invention, the image generator is arranged to determine a position in the image for the graphic element in response to a direction estimate for the first directional audio component.

The direction estimate may often be determined by the extractor as part of the spatial filtering.

According to an optional feature of the invention, the extractor is arranged to generate a direction estimate for the first directional audio component and a property of the graphic element is dependent on the direction estimate for the first directional audio component.

This may allow a particularly advantageous visualization of audio events, and may for example provide additional spatial information to the user.

According to an optional feature of the invention, the graphic element is dependent on at least one feature of the set of features.

According to an optional feature of the invention, the apparatus further comprises an audio processor for generating an output audio signal from the multi-channel audio signal, the audio processor being arranged to adapt a processing of the multi-channel audio signal in response to the first audio source property.

The invention may allow a particularly advantageous audio processing/rendering adaptation based on characterization of individual sound components comprised in a multi-channel signal.

The audio processor may be arranged to adapt the processing of the multi-channel audio signal to modify a property of an audio component in the multi-channel signal corresponding to the first directional audio component.

The audio processor may be arranged to adapt the processing of the multi-channel audio signal to generate the output audio signal in response to the first audio source property.

According to an optional feature of the invention, the audio processor is arranged to adapt at least one of an amplitude and a position of the first directional audio component in the output audio signal in response to the first audio source property.

According to an optional feature of the invention, the audio processor is arranged to determine a number of audio components corresponding to different audio sources by applying a spectral masking to the multi-channel audio signal, the spectral masking being dependent on the first audio source property.

According to an optional feature of the invention, the extractor is arranged to generate a direction estimate for the first directional audio component and the audio processor is arranged to adapt a processing of the multi-channel audio signal in response to the direction estimate for the first directional audio component.

According to an optional feature of the invention, the audio processor is arranged to adapt a processing of the multi-channel audio signal in response to at least one feature of the set of features.

According to an optional feature of the invention, the assigner is arranged to determine a second audio source property for the first directional audio component from the set of audio source properties for the first audio source category, the second audio source property being for a different audio source than the first audio source property.

The approach may be particularly advantageous and efficient for polyphonic classification and may allow effective detection and characterization of multiple sources even if these are substantially in the same direction.

According to an optional feature of the invention, the categorizer is arranged to determine a second audio source category out of the plurality of audio source categories for the first directional audio component in response to the set of features; and the assigner is arranged to determine a second audio source property for the first directional audio component from a set of audio source properties for the second audio source category.

The approach may be particularly advantageous and efficient for polyphonic classification and may allow effective detection and characterization of multiple sources even if these are substantially in the same direction.

According to an optional feature of the invention, the extractor is arranged to generate a direction estimate for the first directional audio component, and the apparatus further comprises a data processor for generating characterization data for the first directional audio component, the characterization data comprising data indicative of the first audio source property, the direction estimate for the first directional audio component, and at least one feature of the set of features.

According to an aspect of the invention, there is provided a method comprising: receiving a multi-channel audio signal representing audio for a scene; extracting at least a first directional audio component by applying a spatial filtering to the multi-channel signal, the spatial filtering being dependent on the multi-channel audio signal; determining a set of features for the first directional audio component; determining a first audio source category out of a plurality of audio source categories for the first directional audio component in response to the set of features, each audio source category of the plurality of audio source categories being linked to a set of one or more audio source properties; and assigning a first audio source property to the first directional audio component from a set of one or more audio source properties linked to the first audio source category, wherein the extracting comprises: dividing audio channel signals of the multi-channel audio signal into a plurality of frequency interval signal components; determining a direction for each frequency interval signal component of the plurality of frequency interval signal components; grouping frequency interval signal components into groups in response to the directions for each frequency interval signal component; and generating a directional audio component by combining the frequency interval signal components of a group of frequency interval signal components.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description will focus on an audio event visualization apparatus, method, and application, but it will be appreciated that the described approaches and principles may be used for many other purposes, and in many different ways in other embodiments and applications.

Figure 1:
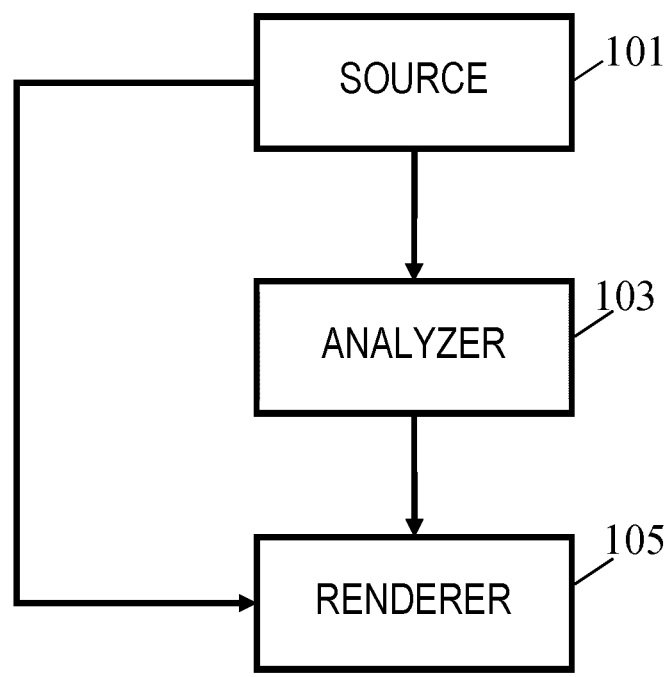
FIG. 1 illustrates an example of elements of an audio event visualization apparatus in accordance with some embodiments of the invention.

FIG. 1 illustrates an example of elements of an audio event visualization apparatus which is arranged to provide visual information about audio of an audio scene.

The audio event visualization apparatus comprises a source 101 providing audiovisual data for a scene. The audiovisual data may specifically comprise video or image data representing the visual scene. The audiovisual data further comprises audio data representing the audio scene that corresponds to the visual scene. Thus, the audiovisual data comprises audio data and visual data providing a combined audiovisual representation of a scene. The audiovisual data may for example be data generated by a gaming application, such as a first person shooter game, and thus the audiovisual data may represent the auditive and visual perception of the scene presented to the user/gamer.

In some embodiments, the source 101 may be an internal processor dynamically generating the audiovisual data e.g. in response to user inputs (such as from a game controller), and often in real time. For example, the source 101 may be a gaming processor executing a game application/program. In other embodiments, the source 101 may e.g. be a receiver receiving the audiovisual data from an external source, and the audio visual data may e.g. be pre-generated. In other scenarios, the audiovisual data may come from different applications as a merged audio stream and visual stream, such as e.g. Skype and a video game running at the same time on a PC.

The audio data representing the audio scene is provided in the form of a multi-channel signal. This is practical for many applications as it allows direct rendering of the audio using conventional channel based rendering systems, such as 5.1 or 7.1 surround sound systems. The multi-channel signal is a spatial signal and comprises a plurality of audio channels each of which is associated with a nominal rendering position/direction with respect to a nominal listening position. The multi-channel signal provides a representation of sound received at the nominal listening position. It provides a representation of the audio scene as perceived from the nominal listening position.

If the multi-channel signal is rendered using a sound system that does not have the same spatial capabilities as in the nominal multi-channel rendering set-up, such as a conventional stereo (e.g. headphone based) or mono audio system, the spatial perception of the audio may be substantially reduced. This may in many applications degrade the user experience and may in many scenarios effectively reduce the information available to the user. For example, in gaming applications it may make it substantially more difficult for the gamer to determine locations and directions to other gamers or e.g. objects, explosions, shots, etc. in the game environment.

The audio event visualization apparatus of FIG. 1 is arranged to analyze the multi-channel signal in order to characterize one or more audio components or sources (including events) of the audio scene. The source 101 is accordingly connected to an audio analyzer 103 which is arranged to analyze the multi-channel signal. As will be described in the following, the audio analyzer 103 will generate at least one audio source property for at least one audio component of the multi-channel signal. The audio source property may typically be indicative of a category or class to which the corresponding audio source is estimated to belong.

Typically, the audio analyzer 103 may generate audio source properties for a plurality of audio sources in the audio scene. Further, the audio analyzer 103 may typically provide additional information such as directional information and/or features/properties of directional audio components of the multi-channel signal that have been generated in the process of determining the audio source property.

The determined audio source property, as well as typically directional and feature data, for a given estimated audio source is provided to a renderer 105. The renderer 105 is further provided with the visual data from the source 101 and is arranged to render this visual data. For example, the renderer may render the images represented by the visual data images for presentation on a suitable display, such as a computer monitor, TV, or virtual reality headset.

In addition to the rendering of the images, the renderer 105 is arranged to add a graphic element (typically an overlay graphic (or graphics)) to the rendered image. The graphic element may provide a visual indication of a property of the audio scene/the multi-channel signal. Specifically, an overlay graphic may be generated and overlaid the rendered image with the overlay graphic being an indication of the audio source property, such as an indication of an explosion. In many embodiments, the overlay graphic may further include an indication of the corresponding direction and/or a feature of the sound.

For example, the renderer 105 may generate an overlay graphic for an explosion with the graphic depicting a label identifying that the detected sound is an explosion and an arrow aimed in the direction of the sound and with a length corresponding to how loud the sound is. The overlay graphic may accordingly provide a visual representation of characteristics of the audio scene which may provide additional information to the user, e.g. in cases where the used sound system is not capable of providing such data (or e.g. if the application is used without sound (e.g. if the user does not have access to headphones or is hearing impaired)).

The apparatus of FIG. 1 may thus provide an improved user experience and additional information in many embodiments and scenarios. However, the performance and user experiences are heavily dependent on the analysis performed by the audio analyzer 103 and the information and the characterization of the audio sources that can be provided by this. For example, merely providing an estimation of the direction and level of an audio component in the audio scene will tend to only allow very limited relative visual feedback. In the following, an audio analyzer 103 will be described which is capable of performing a specific analysis to generate improved and particularly advantageous data that allows improved performance and usage in many embodiments, scenarios, and applications. It may in particular provide improved and/or enhanced visualization of audio properties in audio event visualization apparatuses such as that of FIG. 1, and the description of the operation of the audio analyzer will be focused on this context and on the use of the generated data for visualizing audio properties of an audio scene.

Figure 2:
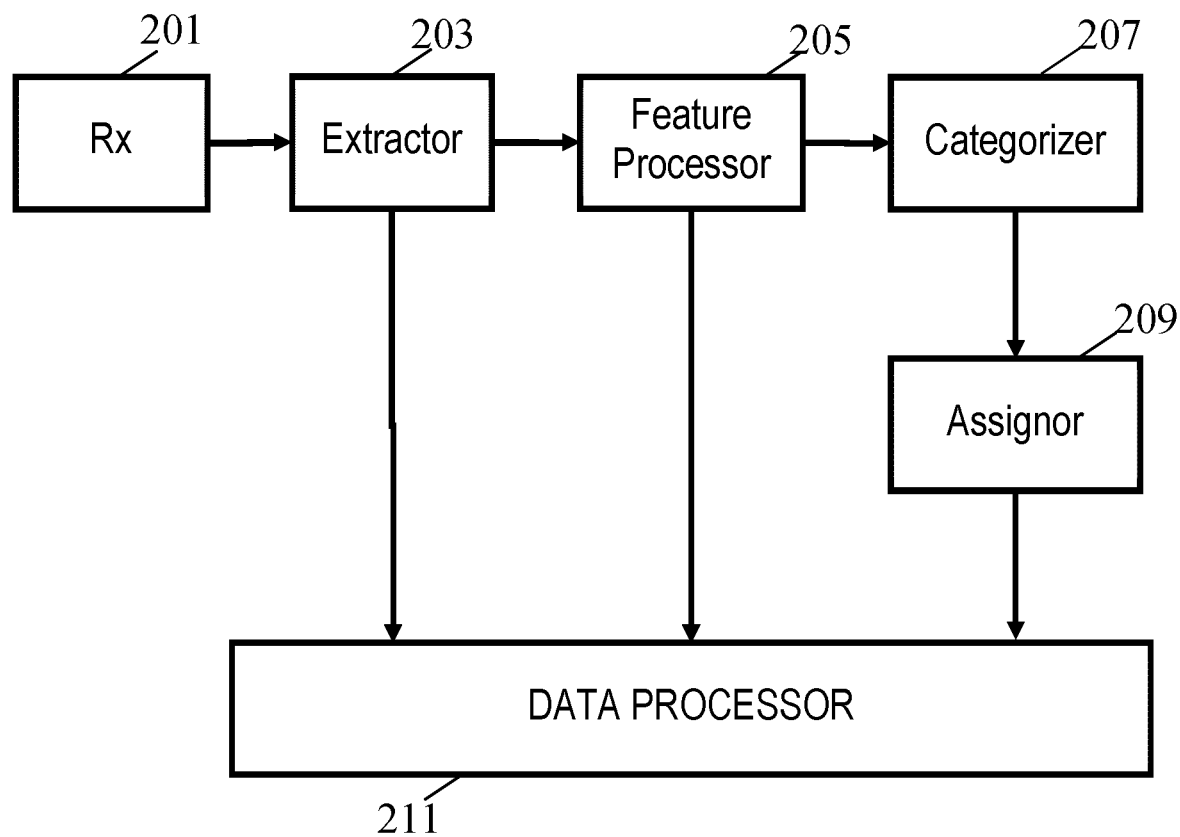
FIG. 2 illustrates an example of elements of an audio analyzer in accordance with some embodiments of the invention.

FIG. 2 illustrates an example of an audio analyzer in accordance with some embodiments of the invention. FIG. 2 may specifically illustrate the audio analyzer 103 of FIG. 1.

The audio analyzer 103 comprises a receiver 201 which receives the multi-channel signal, in the specific case from the source 101.

The receiver 201 is coupled to an extractor 203 or spatial filter which is arranged to extract at least one, and typically a plurality of directional audio components, from the multi-channel signal by applying a spatial filtering to the multi-channel signal.

Each directional audio component may specifically correspond to the audio of the multi-channel signal in a given direction/beam from the nominal listening position of the multi-channel signal. The multi-channel signal is a spatial audio signal which represents the audio scene from a given listening position. It includes a number of audio components corresponding to different audio sources in the scene combined into the channels of the multi-channel signal. Some audio components may correspond to audio that has few or no directional cues to the listener. For example, the audio scene may include audio from non-directional distributed and diffuse audio sources such as ambient or background noise/audio. Other audio components may correspond to audio that do provide directional cues and specifically some audio components may correspond to specific audio sources/events occurring at well-defined locations in the audio scene and e.g. reaching the listening position via direct routes thereby providing strong, well-defined, and narrow spatial cues.

The audio components are represented by the audio channel signals of the multi-channel signal. For a given audio component, each audio channel signal may comprise a contribution depending on the nature and spatial position of the audio source as will be well known to the skilled person. For example, diffuse background audio may be substantially equally and non-coherently represented in each audio channel whereas a point source from a spatial position corresponding to a nominal position for only one audio channel may only be represented in the that audio channel with no contributions in any of the other audio channel signals.

Thus, a listener listening to the multi-channel signal using a corresponding multi-channel audio system will typically perceive some diffuse and non-spatially specific audio sources as well as typically one or more spatially specific sound sources, e.g. being perceived as point sources. The listener will tend to perceive such sound a coming from specific directions and angles.

Typically, the audio scene will dynamically change character with audio sources/events occurring at different times. For example, for a first person shooter game, background audio may be relatively constant and supplemented by audio such as gunshots, explosions etc. occurring as individual audio events linked to individual game events.

The spatial filter may be an angular filter and each directional audio component may correspond to the audio of the multi-channel signal resulting from applying a spatial (e.g. angular) filter to the multi-channel signal. The spatial filter may correspond to a beamform pattern, and the directional audio component may correspond to the audio received at the (nominal) listening position in a beam corresponding to the spatial filter response. Thus, the directional audio component may correspond to the audio that would be received at the listening position from a directional microphone (or a microphone array) having a beamform corresponding to the angular filter (specifically with the beamform and angular filter having the same attenuation as a function of azimuth and/or elevation angle).

The extractor 203 is arranged to perform an adaptive spatial filtering, and specifically the spatial filtering is dependent on the multi-channel audio signal itself. Thus, rather than the spatial filtering being a constant, predetermined spatial filtering, the extractor 203 is arranged to adapt and modify the spatial filtering based on properties of the multi-channel signal.

The extractor 203 may specifically be arranged to adapt the spatial filtering to select audio sources and audio components in the multi-channel signal. The extractor 203 may be arranged to adapt the spatial filtering to direct a beam in a direction in which the multi-channel signal exhibits increased audio levels (relative to other directions).

It will be appreciated that any suitable approach for adapting the spatial filtering to select audio sources/components in the multi-channel signal may be used. For example, in some embodiments, a plurality of different predetermined filters may be defined and applied to the multi-channel signal thereby generating a number of spatially filtered signal. For example, a spatially filtered signal may be generated for every 10° resulting in 36 signals. The extractor 203 may then detect the signal with the highest signal level and select this as the directional audio component to be further processed/analyzed (or may e.g. select the highest N signals for generating N directional audio components).

As another example, in some embodiments each time-frequency slot may be given an angular value that represents the underlying "location" of the (dominant) source of the audio in this time-frequency slot. Several time-frequency slots may then have similar angular values that reflect the directions in which there is acoustical activity.

A typical audio scene contains instances of sound sources at different locations (for instance front, left and behind) relative to a reference point (the listener). The resulting audio signal typically does not retain the spatial information of the sources (only the object format does that). Spatial extraction may be considered a way to retrieve the original signal based on a computed location from the observed multi-channel signal. The extractor 203 may perform a scene audio source detection/estimation and this may include estimating a direction/spatial property of these audio sources.

The extractor 203 is coupled to a feature processor 205 which is provided with the directional audio component(s) that have been generated by spatial filtering by the extractor 203. The feature processor 205 is arranged to determine a set of features for each of the directional audio components.

A feature of a directional audio component may be a value (or set of values) indicative of a property (or set of properties) of the directional audio component. A feature may in many embodiments be a property of the directional audio component, such as e.g. a signal level, a frequency distribution, a timing etc.

The features may be standard audio descriptors or e.g. custom features. For example, for a signal representing a directional audio component, features can be extracted from:
 the corresponding time domain signal (autocorrelation, zero crossing rate, etc.),
 the corresponding frequency domain signal (energy, spectral moments, etc.),
 the corresponding harmonic domain signal (fundamental frequency, etc.),
 the corresponding cepstral domain signal (Mel-frequency Cepstral Coefficients, etc.),
 a perceptually filtered signal (Bark, ERB coefficients, etc.).

It will be appreciated that many different approaches and algorithms for extracting, determining, and generating features representing properties of an audio signal are known to the skilled person and that any suitable approach may be used.

In the specific example, the feature processor 205 may generate a set of features denoted by $x_j(t) \in \mathbb{R}^d$ extracted from the directional audio component signals $y_j(t)$.

The feature processor 205 is coupled to a categorizer 207 which is arranged to determine an audio source category out of a plurality of audio source categories for each of the directional audio components in response to the set of features.

Thus, the categorizer 207 may have stored a set of categories (classes/groups/sets) of audio sources where audio sources within a given category has some shared properties or characteristics.

An audio source may be any cause or originator of audio and may refer to e.g. a specific object in the scene or to a temporal event. Thus, the audio source may be an audio source object and/or an audio source event. An audio source may be considered to be temporally restricted (e.g. occurring for a short time and corresponding to an audio event) or may e.g. be considered to have a longer temporal extension (e.g. corresponding to a permanent object causing the audio). In some embodiments, the set of categories may be associated both with audio events and with audio source objects, e.g. some categories may represent specific audio events and some categories may represent audio generating objects.

In some embodiments, one or more of the categories may be associated with a specific type of audio event, such as e.g. an explosion, a gunshot, a person speaking etc. In some embodiments, one or more of the categories may for example be determined by having a common property of audio generated by such an audio source, such as music, diffuse noise, etc. Thus, the exact nature and characteristics of each of the categories, including the reason for or characteristics of the categories, may depend on the individual embodiment.

The audio source categories are associated with some properties or characteristics of audio from an audio source belonging to the category. Specifically, each category may be linked to a set of features being indicative of properties of audio from audio sources of that category. The features may reflect properties that are always present for audio source belonging to that category or may reflect properties that are typically, or potentially only sometimes, present for audio belonging to that category. Often, the features associated with a given category may be a combination of such features.

The set of features associated with the categories may directly match the set of features determined for the directional audio components, i.e. there may be a direct match between each feature determined for the directional audio component and a feature stored for each category. However, in many embodiments, the sets of features may not be identical. For example, some features may for some directional audio components and/or categories are optional and may only be considered when present for both category and directional audio component. In some embodiments, features for the directional audio component and/or one or more categories may be processed or combined to match.

The categorizer 207 is arranged to determine an audio source category for the directional audio components in response to the features determined for the directional audio components. Specifically, for at least one of the directional audio components generated by the spatial filtering and for which features have been determined, the categorizer 207 proceeds to select at least one category. The category may specifically be determined as the one for which the set of features of the category most closely match the features of the directional audio component in accordance with any suitable criterion or algorithm.

Each category of the plurality of categories is associated with a number of properties, attributes, features for audio generated by an audio source of that category of audio sources. Each category may be associated with a type of audio source, i.e. it is not associated with one specific instance of a given audio source but is associated with a category, classification, group, set, etc. of audio sources having at least one common characteristic.

The categorizer 207 may accordingly proceed to determine an audio source category that is considered to most closely match the (properties of the) directional audio component.

The categorizer 207 is coupled to an assigner 209 which is arranged to assign an audio source property to the directional audio component(s) from a set of audio source properties that are associated with the audio source category to which the directional audio component is found to belong to by the categorizer 207.

In many embodiments, the audio source property may simply be the audio source category determined by the categorizer 207, i.e. it may simply be an identification of the determined category. For example, each category may be associated with a label or descriptor indicative of a specific type of audio source, such as human speaker, explosion, scream, gunshot, siren, engine noise, etc. etc. This label or descriptor may accordingly be assigned to the directional audio component thereby identifying a type of audio source that the directional audio component is considered to represent.

In some embodiments, the assigner 207 may additionally or alternatively assign other audio source data. For example, the categories may be associated with some typical properties of the corresponding audio generated by the audio source represented by the category. For example, it may be associated with a typical frequency characteristic (e.g. thunder tends to have a concentration of energy at low frequencies), a spatial definiteness (e.g. indicating a typical spatial spread of the audio source), etc.

In some embodiments, the assigner 209 may also be arranged to assign other data than audio property data to the directional audio component. For example, for each category, there may be stored a threat or danger level and this data may be assigned to the directional audio component. For example, an audio source category labelled as (and corresponding) a lion's roar may be assigned with a high danger level whereas an audio source category labelled as (and corresponding to) bird song may be assigned a low danger level.

The categorizer 207 is thus arranged to perform a classification to determine a class/category for one or more of the directional audio components extracted from the multi-channel signal by the spatial filtering. The assigner 209 may then assign characterizing data to the directional audio component based on the identified class/category, and specifically the assigner 209 may assign data indicating the class/category itself. Specifically, the categorizer 207 and the assigner 209 may function as a classification system that outputs the label corresponding to the sound event associated with the identified class/category.

In some embodiments, the categorizer 207 may perform multiple categorizations/classifications which may be used at the same time, e.g. using a potential hierarchy of the determined categories. For example, a classifier for animal vs human, a classifier to determine dangerous animal from pacific animal, and a classifier to distinguish children from adult may be employed. All of this information may have a visual counterpart in the renderer 105.

In some embodiments, the classification may be relatively simple with a distance measure being calculated based on comparing feature values for the directional audio component with corresponding feature values for the categories and selecting the category resulting in the lowest distance measure.

In many embodiments, more complex approaches may be used. For example, the classification may output the label corresponding to the sound event $\hat{z}_j = \mathcal{R}(x_j)$ based on a classification approach using a machine learning algorithm that learns to classify sounds from a dataset of examples $(x_i, z_i)_{i=1}^n$. The algorithm may be trained by minimizing a loss function $\mathcal{L}(z_i, \mathcal{R}(x_i))$ between the true value $z_i$ and the predicted value $\mathcal{R}(x_i)$, and after the training the category minimizing the loss function for a given directional audio component may be selected as the corresponding category for that directional audio component.

A specific algorithm uses a particular feature called the Normalized Power Spectrum (NPS) which is constructed by:
taking the Fourier Transform (FT) of a frame $X_j = FT(y_j)$,
taking the squared value of the $FT |X_j|^{0.2}$
normalizing this so that it sums to 1

$$x_j = \frac{|x_j|^2}{\|x_j\|^2}$$

Then, a non-parametric density estimation using kernel density estimation with a multinomial kernel allows a Maximum A Posterior (MAP) decision rule to be derived for the classification:

$$p(z_j | x_j) = \frac{1}{n}\sum_{i=1}^{n} K(x_j, x_i) 1_{z_j = z_i}$$

Thus, a classification system may in some embodiments be provided that outputs the label(s) corresponding to the sound event $\hat{z}_j(t) = \mathcal{R}(x_j(t))$ where $\mathcal{R}$ is the decision rule given as the minimization of $p(z_j|x_j)$ as given above. A more detailed description may be found in "Real-Time Monophonic and Polyphonic Audio Classification from Power Spectra" by Maxime Baelde, Christophe Biernacki, Raphaël Greff e.g. available from https://hal.archives-ouvertes.fr/hal-01834221v2, to be published in Pattern Recognition.

The label, and typically additional information, may then be provided to the renderer 105 which may proceed to generate a visual representation of the result of the classification. As a simple example, the renderer 105 may simply present the label of one or more selected categories. Thus, if the system detects that a directional audio component is present which corresponds to a specific category, a visual indication may be provided to indicate that a corresponding audio source has been identified in the audio scene. For example, the renderer 105 may present a label saying "explosion" if the classification has identified that a directional audio component is present which is classified as belonging to a category associated with an explosion sound source (an explosion sound event).

Thus, the system may e.g. display spatial and semantic audio information in real time and may provide enhanced or additional information to a user.

In some embodiments, the extractor 203 may be arranged to perform the spatial filtering by dividing the multi-channel signal into typically small segments and grouping segments based on an estimated dominant signal direction for each segment.

Figure 3:
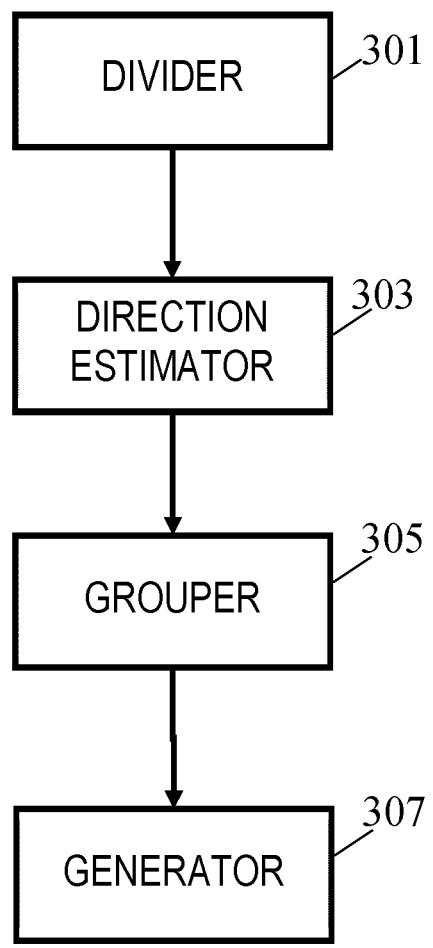
FIG. 3 illustrates an example of elements of an extractor for an audio analyzer in accordance with some embodiments of the invention.

FIG. 3 illustrates an example of an extractor 203 in accordance with this approach.

In the example, the extractor 203 comprises a divider 301 which is arranged to divide the audio channel signals of the multi-channel audio signal into a plurality of frequency interval signal components or segments. The division is typically performed in time frames/slots/intervals/segments, and thus the divider 301 generates time frequency segments for each of the channel signals of the multi-channel signal.

Such time frequency segments are often referred to as time frequency tiles and thus the divider 301 is arranged to segment each audio channel signal into time frequency tiles. The divider 301 may specifically perform this division by dividing each of the signals into time segments (using suitable windowing as will be known to the skilled person) and performing an FFT on the signal in each window. Each resulting bin value then corresponds to a specific time frequency tile for the time segment and bin frequency.

The divider 301 is coupled to a direction estimator 303 which for each time frequency tile is arranged to estimate a direction for the sound in that time frequency interval. This may specifically be done by comparing the signal levels from the corresponding time frequency tiles of all the audio signals. For example, if the signal level is very high for one channel and very low for all other channels, the audio in that time frequency tile is likely to be caused by a single dominant sound source in the direction of the nominal (loudspeaker) position associated with that channel. If a dominant sound source is positioned in a direction between the positions of the audio channels, the relative signal level may be much higher in the two channels between which the audio source dominant in that time frequency tile is positioned than for other channels.

Thus, as a low complexity example, the direction estimator 303 may be arranged to generate a direction estimate for a given time frequency tile as a weighted combination of the positions associated with each channel, and where the weights increase for increasing signal levels in the time frequency tiles.

It will be appreciated that for more diffuse and less directional sound sources, including sound sources reaching the listener via a number of reflections, the direction estimate may tend to be less specific. Similarly, the direction estimate is less well defined for time frequency tiles in which there is no single dominant sound source. However, the described low complexity approach of using a weighted combination to determine a direction estimate may still provide acceptable performance in many scenarios. Indeed, the less specific direction estimates in these cases may result in an increased variation in the estimate which may result in such time frequency tiles having less average contribution in the subsequent generation of the directional audio components. In other embodiments, a measure of the specificity of the direction estimate for a given time frequency tile may be generated and used subsequently.

The direction estimator 303 is coupled to a grouper 305 which is arranged to group the frequency interval signal components, i.e. the time frequency tiles, into groups in response to the estimated directions for the components/tiles. The grouper 305 may group the tiles into groups corresponding to different directions with the tiles of each group having direction estimates that are close to each other. Thus, each group of tiles may include tiles for which the direction estimate is substantially the same or sufficiently close. For example, each tile may be determined to belong to the group for which the difference between the direction estimate for the tile and the (possibly weighted) average direction estimate for the group is the smallest possible, i.e. each tile may belong to the group which has the closest average direction estimate. The direction estimate may in many embodiments be an angular direction estimate.

It will be appreciated that many different approaches and algorithms for grouping values are known and that any suitable approach may be used. For example, different clustering algorithms are known and may be applied to provide a grouping adapting to the specific set of values. In some embodiments, all tiles may be grouped into a group. In other embodiments, some tiles may e.g. be discarded. For example, if it is considered that the tile does not have a reliable or specific direction estimate, e.g. due to there being no dominant sound source in that tile, the tile may be discarded and not allocated to any of the groups.

The grouper 305 is coupled to an audio component generator 307 which is arranged to generate the directional audio components corresponding to the different clusters/groups.

In some embodiments, this may be done directly using the groups by combining the frequency interval signal components, i.e. the time frequency tiles, of each of the groups.

For example, all the FFT bins allocated to a specific group, and thus a group of FFT bins estimated to comprise dominant sound received from a given direction, may be selected. FFT bin values for bins not included in the group may be estimated, e.g. by interpolation between the selected FFT bins. The resulting time frequency signal may then be converted to the time domain by an inverse FFT. In this way, both a time domain and frequency domain representation of a directional audio component representing sound from a given direction can be generated. The time and frequency domain representations may then be provided to the feature processor 205 which may proceed to generate a set of features for that directional audio component.

As another example, the main direction, e.g. determined as the mean or average (angular) direction for a given group may be determined. A spatial filtering using a predetermined spatial filter shape/beamform shape may be applied to the multi-channel signal with the center of the shape being directed in the determined average direction for the group.

A specific approach for determining the directional audio component may e.g. follow an approach as disclosed in EP3297298A1.

The extractor 203 may perform spatial filtering by a three-stage approach:
1. A spatial analysis may compute the directional activity of the multi-channel signal x(t), which results in a set of angles per frequency θ(f,t).
2. The angles may then be clustered to get the number of actives directions $d_j(f,t)$.
3. A spatial-frequency masking may then be performed based on the previous results to get the separated signal $y_j(t)$. A spatial masking and then a frequency masking can be applied.

The approach may allow non-direct path contribution (mainly reflections) from the set of angles per frequency θ(f,t) to be discarded.

With respect to the first step, a method of analyzing the multi-channel signal x(t) is used to extract spatial directivity of sounds inside the signal. This method takes as input the multi-channel signal and outputs an angle related to each frequency θ(f,t), i.e. it may output an angle for each time frequency interval. For instance, the so-called active and reactive intensity vector may be determined and used to extract the angles. The active intensity vector $D_a(f,t)$ refers to the real-part of the normalized complex intensity I(f,t) vector and is perceptually related the primary directional sound field. The reactive intensity vector $D_r(f,t)$ refers to the imaginary-part the normalized complex intensity vector and is perceptually related to the ambient diffuse sound field.

With respect to the second step, once the spatial position (angle) of the elementary "source" component at time t θ(f,t) is found, this may be analyzed to extract the main directions $d_j(t)$ in which sounds are present. This may be done by clustering θ(f,t) into several clusters and then determining the mean of these clusters as the principle directions. The clustering also gives the number of active sound sources/events present at time t. If this number of active events is not known, a model selection can be performed to obtain the optimal number of events: the idea is to cluster with different number of events and keep the model which optimize a certain criterion. One possible way to do this is to fit a mixture model (a Gaussian Mixture model for instance) to the data and to e.g. keep the model that optimizes the BIC (Bayesian Information Criterion). As another example, a K-means algorithm or other clustering algorithms could be used.

With respect to the third step, given several directions, the apparatus can filter every source in every direction. A spatial window $w(f,d_j)$ function like a rectangular window or sinusoidal window can be used to smooth the filtering around the main direction. The idea is to gather the frequencies corresponding to $d_j(t)$ and compute the filtered primary source at this direction. These sources are then converted into the time domain using the IFFT $y_j(t)$.

It will be appreciated that some of these steps may be performed jointly, e.g. by iterating between the steps. Specifically, the first and second or second and third steps may be jointly performed.

The described approach may provide a particularly efficient approach for detecting and e.g. labelling individual sound sources/events in an audio scene represented by a multi-channel signal. It may in particular utilize spatial sound source separation thereby e.g. allowing a single audio source to be identified and labelled.

However, the approach may also provide particularly efficient performance for detecting multiple sound sources, and indeed multiple sound sources that may be in the same direction with respect to the listening position. Thus, in many embodiments, the audio analyzer 103 may perform a polyphonic classification.

Specifically, the assigner 209 may be arranged to assign two audio source properties, such as two class labels, to one directional audio component where the two properties relate to different audio sources/events. For example, the assigner 209 may assign two different audio source labels to one directional audio component reflecting that it is estimated that the directional audio component comprises contributions from two different audio sources in the same general direction.

In some embodiments, one or more of the audio source categories may be associated with more than one audio source. For example, one category may correspond to both an explosion and a scream. The features for such a category may accordingly reflect the combined audio of an explosion and a scream. If such a category is detected to most closely match the features of a directional audio component, this may be considered to correspond to two audio sources (scream and explosion) and may be assigned both labels. In practice, such combined audio source features and decision criteria may be determined by an extensive training process.

In other embodiments, the audio analyzer 103 may be arranged to determine more than one category for the directional audio component. Thus, it may for a directional audio component determine that it closely matches both a first and second category and the labels of both of these may be assigned to the directional audio component. For example, if it is determined that a match measure exceeds a threshold both for a category associated with a scream and a category associated with an explosion, the directional audio component will be assigned both the label of scream and the label of explosion. Thus, in such an example, a multi-class classification may potentially result for one directional audio component, and accordingly this may be assigned data from multiple classes.

Thus, in some embodiments, the audio classification may be performed by a polyphonic classifier, enabling multiple labels to be output per direction.

Indeed, rather than assume that each directional audio component contains only one active source (monophonic case), the approach may allow multiple audio sources to be associated with a single directional audio component. For example, if it is assumed that the directional audio component comprises two different signals $x_1$ and $x_2$ from two distinct categories/classes $z_1$ and $z_2$, the mixed NPS feature of the signal x can be computed using the individual signals and a signal-dependent proportion ϕ:

$$x=\phi x_1+(1-\phi)x_2$$

where $\phi=P_1/(P_1+P_2)$ is the ratio of the power of each source relatively to the sum of the two powers. A polyphonic decision rule can then be constructed using mixtures of the monophonic kernels.

Since the polyphonic NPS is a weighted sum of the monophonic NPS, the decision rule is based on the same conditional probability (as defined earlier as the Maximum A Posterior (MAP)), but the prototype used in the kernel density estimated is the polyphonic NPS based on the monophonic ones. Therefore, this polyphonic classification method only learns mixed sound from individual ones, which is an advantage compared to standard polyphonic classifiers.

The audio analyzer 103 may accordingly determine one or more categories/classes for one or more directional audio components of the multi-channel signal. Specifically, a sound source label may be applied to one or more directional audio components.

As previously mentioned, the audio analyzer 103 generates data which is used in the classification. In many embodiments, this data may also be useful for other purposes than the classification.

Specifically, as part of the spatial filtering and extraction of a directional audio component, the extractor 203 may typically determine a specific direction estimate for the directional audio component. In some embodiments, this directional data may also be output and used, e.g. by the renderer 105.

Also, the feature processor 205 determines a number of features that are used for the classification by the categorizer 207. In some embodiments, one or more of these features (or indeed potentially other features not used by the categorizer 207) may be output for further use, e.g. by the renderer 105.

In the specific example of FIG. 2, the audio analyzer 103 comprises a data processor 211 which is arranged to generate characterization data for the directional audio components. For at least one of these directional audio components, this characterization data comprises data indicative of the assigned audio source property (typically a sound source label), the direction estimate for the directional audio component, and at least one feature of the set of features determined for the directional audio component.

Thus, in such embodiments, the audio analyzer 103 may generate a combined and consistent set of data which indicates a direction and type of an audio source/event with associated features for this. This may provide a particularly advantageous set of data that allows a highly useful characterization of the audio source. This may provide a substantially improved performance for many applications, such as for example for audio visualization systems such as that of FIG. 1.

In the example of FIG. 1, the output from the audio analyzer 103 is provided to the renderer 105 and used to provide a visual representation of one or more of the classified directional audio components.

It will be appreciated that the exact visual representation, and indeed what data is represented, may depend on the preferences and requirements of the individual embodiment and the specific application.

In many embodiments, the renderer 105 may be arranged to render a graphic element which may e.g. be overlaid the corresponding image of the scene, i.e. the visual scene representation. However, in other embodiments, text or e.g. graphics may not be overlaid the image but may e.g. be presented on a secondary screen or a secondary display like LED array (e.g. embedded in the keyboard or around the screen).

In many embodiments, the renderer 105 may be arranged to generate a graphic element (specifically an overlay graphic) representing a characteristic or property of one or more of the directional audio components. The graphic element may be included in an image of the scene and may specifically be an overlay graphic that is overlaid on top of the image of the scene thereby providing additional visual information about the audio scene.

The graphic may typically be indicative of the audio source property assigned to the directional audio component, such as specifically the category name or label. This information may for example be provided by a textual rendering of the label. In other embodiments, a graphic representation, such as an icon, may be rendered. For example, a gunshot may be indicated by a silhouette of a gun being overlaid the image. In some embodiments, the presence of a graphic element may itself indicate the specific category. For example, the renderer 105 may be set up to e.g. add a transparent color overlay on a part of the screen if a specific sound is detected in the audio scene, and the presence of such a color tint may indicate that a sound of that category has been detected in a particular direction (e.g. a red tint may indicate a large explosion).

In many embodiments, the (overlay) graphic element may further indicate a direction for the directional audio component. E.g., a property of the graphic element may indicate the direction towards the detected sound source.

In some embodiments, this may be done by adapting the position of the graphic element in the rendered image in response to the direction estimate for the directional audio component. For example, the direction estimate may indicate whether the corresponding audio source is to the left or right of the current viewer orientation and the graphic element may be positioned towards the left or right depending on this. In some embodiments, the graphic element, such as e.g. an icon, may be positioned on the image such that it is perceived to be in the direction estimated for the audio source. If the direction is outside of the current viewport, the graphic element may be positioned at the edge of the screen as close as possible to the estimated direction.

In some embodiments, the graphic element may itself be dependent on the direction estimate for the directional audio component. Thus, a property of the graphic element may depend on the direction estimate. For example, a graphic element in the form of a circle may be generated and rendered when a directional audio component belonging to a specific category is detected. Within this circle a cross may be shown indicating the direction and distance towards the sound source thereby providing a radar effect showing the estimated position of the sound source relative to the user. In such an example, the position of the cross, and thus the rendered graphic element, may be adapted based on the estimated direction (and distance) to the audio source.

In some embodiments, the orientation of the graphic element may be dependent on the direction estimate for the directional audio component. For example, the graphic element may be an arrow which is positioned at the same position in the rendered image but is oriented to point towards the estimated direction of the sound source. Thus, the graphic element in the form of an arrow may be rotated towards the sound source. It should be noted that this is equivalent to changing the content of the graphic element based on the estimated direction (e.g. arrows pointing in different directions can be considered to be the same graphic that is rotated or can be considered to be different graphic elements).

In some embodiments, the graphic element be dependent on one or more of the features determined by the feature processor 205. For example, the color of a graphic element representing a directional audio component may depend on the level of the directional audio component, e.g. for low audio levels a green graphic element may be presented whereas for high audio levels the same graphic element may be presented except for it being presented as a red graphic element.

The specific combination of audio features, a direction (and often a distance) estimate, and the class/category for a sound source/event may provide a highly advantageous visual representation of audio in many applications and embodiments.

As mentioned, in some embodiments, the renderer 105 may effectively provide a radar effect. This may take the shape of a circle showing the active area(s) or an arrow (or several) pointing to the active direction(s).

As another example, the visualization may be in the form of e.g. be a form of a scrolling time line showing information about the orientation and labels of the detected audio with audio events appearing on one side of the screen and disappearing at the other side after some time, thereby providing recent audio history to the user.

As another example, secondary display means can be used (specifically display means which do not present the visual scene) such as illuminated (potentially colored) keyboards, a second screen (e.g. smart phone) etc.

In different embodiments, a symbolic representation of the category/class label can be displayed in different ways. It may be by text or a word describing the label or the event (e.g. "big explosion", "several gunshots"). It may e.g. be by an icon representing the class label. A color associated to a given label can also represent the audio events. In addition to text or color visualization, transparent icons can also be used to display class events, icon transparency may e.g. be determined by the energy of the corresponding audio class.

In some embodiments, the graphic element (e.g. as a radar or timeline effect) can be class-specific. For example, the radar can be activated based on a selected class label, i.e. only if a directional audio component belonging to a specific category is detected. Similarly, the graphic element may be deactivated if there is no activity or if the determined categories for the directional audio components do not include any categories being associated with graphic elements In some embodiments, a single graphic element may reflect properties of a plurality of categories. For example, it may show properties for a plurality of audio sources.

It should be noted that the approach is 3D compatible. For example, it is possible that the audio analyzer 103 provides a 3D direction, i.e. orientation and elevation information, with the corresponding categories to the renderer 105. The renderer 105 may then include such information in the representation. For example, a graphic element may be moved horizontally depending on an azimuth estimate, moved vertically in the image based on an elevation estimate, and having a size adjusted based on a distance estimate.

The rendering may in some embodiments be presented on a standard two-dimensional display, but the approach is equally suitable for 3D displays. The visualization may for example be on a Head Mounted Display (HMD). Usually, such a device is aware of the orientation of the head of the user (resp. viewer orientation for FPS) and the rendering of the audio (by the video game engine) is usually adapted to reflect or compensate for changes in the head orientation or position.

In the classical scenario, the head orientation does not need to be compensated in terms of angular orientation by the renderer 105, because the audio engine of e.g. the video game already adapts the rendering of the audio based on the head orientation (resp. viewer orientation for FPS). Hence, the analyzer 103 will process the audio stream that is already adapted to the head orientation (resp. viewer orientation for FPS). Conversely, in the case of a sound event coming from a fixed direction (e.g. when the sound event is short in time or when the displaying of the sound event is longer in time than the audio event itself), this fixed angular information may preferably be adapted to the head orientation by the renderer 105. Indeed, in that case, at the end of the displaying the head orientation may have changed compared to the beginning of the displaying while the sound event is not present anymore in the audio stream.

The described approach may allow improved visualization compared to conventional systems and may accordingly provide an enhanced and improved user experience. Conventional systems tend to merely provide some indication of properties of the audio currently presented and in practice this makes it difficult for users to effectively interpret (often too much information is provided (e.g. the raw audio energy in every direction)). The described approach may include e.g. a real time polyphonic classification step that allows category/type/class labels to be assigned to individual parts of the audio content. This provides for improved visualization and may e.g. enable the system to display a more specific visualization of the audio that will be easier to understand by the users.

The described approach provides a system which is capable of determining and e.g. displaying spatial and related semantic audio information in real time. In many embodiments, the approach may use machine learning to localize and identify the different sound sources within a multi-channel audio stream (e.g. 5.1). The approach may perform a spatial analysis of the audio scene to separate the stream into several mono-channel signals (the directional audio components) and then classify these signals using a classification algorithm. The results may then specifically be used as an input of a visualizer (the renderer 105).

In the previous embodiments, the data generated by the audio analyzer 103 is used for visualization of audio events present in the audio scene. However, it will be appreciated that the data may alternatively or additionally be used for other purposes.

Figure 4:
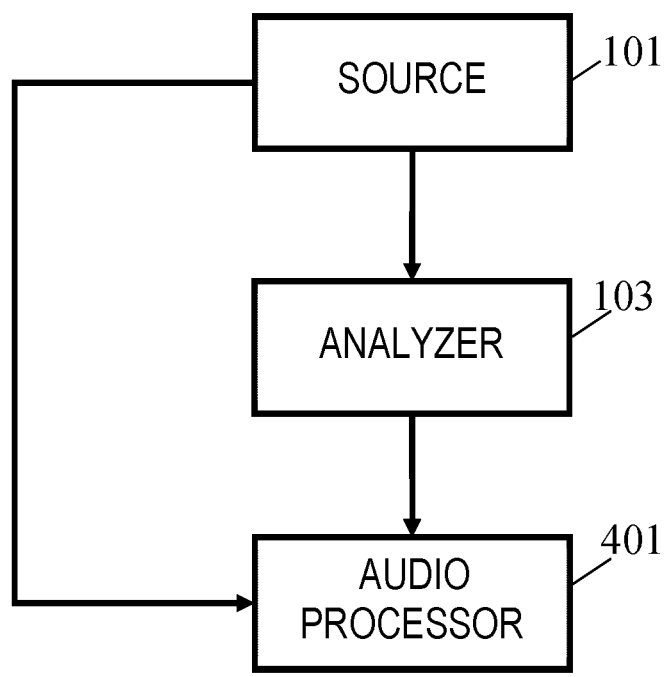
FIG. 4 illustrates an example of elements of an audio processor in accordance with some embodiments of the invention.
Figure 5:
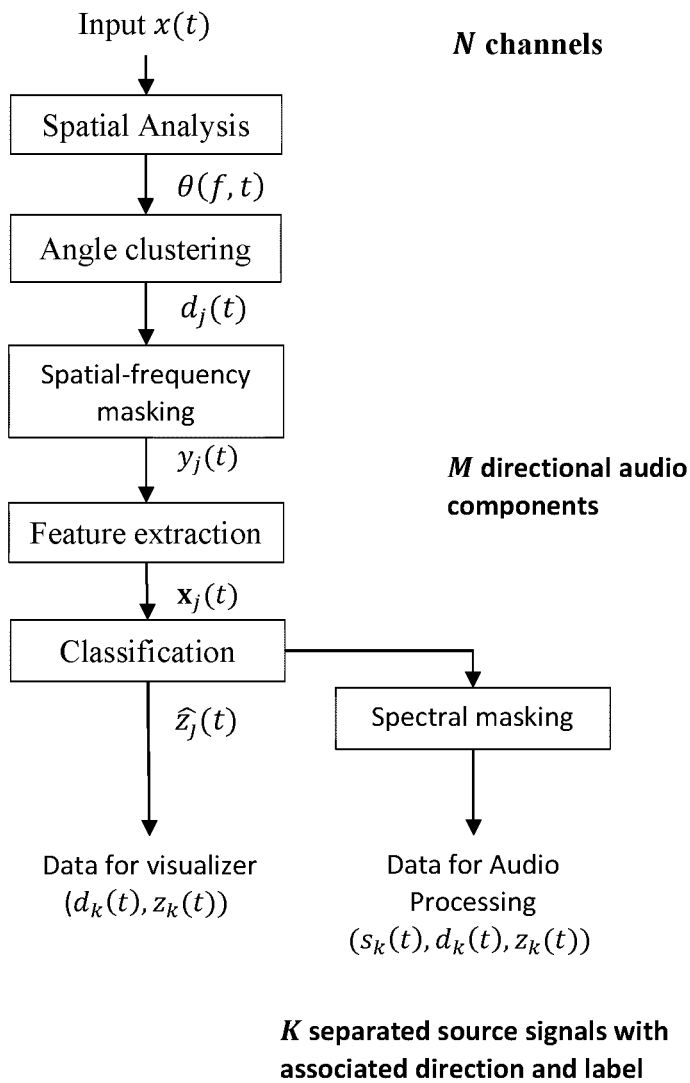
FIG. 5 illustrates an example of a method in accordance with some embodiments of the invention.

In many embodiments, the data may be used to adapt an audio processing, and specifically an audio rendering, of the multi-channel signal. An example of such an apparatus is shown in FIG. 4. In the example, the output from the audio analyzer 103 is provided to an audio processor 401 which also receives the multi-channel signal. The apparatus may correspond to that of FIG. 1 but with the output of the audio analyzer 103 being used by the audio processor 401. In many embodiments, an apparatus may comprise both an audio processor 401 as in FIG. 2 and a renderer 105 as in FIG. 1, and the data generated by the audio analyzer 103 may be used both for visualization and for adapting audio processing. An example of an approach where the audio analyzer 103 is used for both visualization and audio processing is also illustrated in FIG. 5.

In some embodiments, the audio processor 401 may be arranged to generate an output audio signal from the multi-channel audio signal with the audio processing generating this output audio signal being adapted based on data from the audio analyzer 103. The output audio signal may in many embodiments be a signal that can be directly provided to e.g. loudspeakers for rendering or may e.g. be an audio signal intended for further processing. For example, it may be an output signal which is input to a binaural processor to generate a binaural output signal for rendering using headphones.

The adaptation may specifically be in response to the assigned audio source property (or properties), and may typically be by adapting a parameter of the audio processing. The change of an audio parameter will result in a change in the generated output audio signal. For example, in some embodiments, a gain parameter may be modified based on the detection of the presence of a specific audio source in the audio scene. For example, the overall signal level may be increased if thunder is detected. As another example, the frequency response of the audio processing may be changed. For example, a low pass filtering may be introduced following a detection of an explosion (e.g. to emulate temporary hearing impairment following the explosion).

In many embodiments, the adaptation may be based on the detected directional audio component. For example, in some embodiments, the audio processor 401 may be arranged to detect that a specific sound source type has been detected and then seek to remove this sound source from the audio scene.

For example, the audio processor 401 may in response to receiving data from the audio analyzer 103 indicating that the multi-channel signal comprises a sound source corresponding to a siren proceed to subtract the corresponding directional audio component from the multi-channel signal. It may for example do this by applying a spatial filter to the multi-channel signal where the spatial filter is complementary to the spatial filter that is selecting/generating the directional audio component. As another example, the multi-channel signal may be represented by the time frequency tiles generated by the extractor 203 and the audio processor 401 may delete all the time frequency tiles detected to belong to the directional audio component (and e.g. replace them by interpolated values for the remaining time frequency tiles).

In many embodiments, the audio processor 401 may be arranged to adapt at least one of an amplitude and a position of the first directional audio component in response to the first audio source property.

For example, rather than remove a directional audio component completely, the audio processor 401 may be arranged to increase or decrease the relatively signal level for the directional audio component relative to the rest of the audio scene. This may for example be achieved by applying a complementary spatial filtering and/or scaling time frequency tiles belonging to the specific directional audio component. As another example, a multi-channel signal may be synthesized to correspond directly to the directional audio component and this signal component may be added or partially subtracted from the multi-channel signal.

The position of a directional audio component may for example be modified by synthesizing a multi-channel signal corresponding to the directional audio component, subtracting it from the multi-channel signal, applying a rotation to the synthesized multi-channel signal to change the associated position (e.g. by applying a matrix operation), and adding the rotated synthesized multi-channel signal to the multi-channel signal.

As another example, the position of a directional audio component may be directly modified at the spatial meta-data level that are provided by the extractor 203 before the audio processor 401 receives it.

In many embodiments, the audio processing may also be adapted in response to the direction estimate(s) generated by the feature processor 205. For example, if a sound source is detected as increasing (resp. decreasing) by the audio processor 401, the audio processor 401 can enhance or reduce this detected sound depending on the intended effect.

In many embodiments, the audio processing may alternatively or additionally be adapted in response to the features generated by the extractor 203. For example, the audio processing may enhance or reduce a given sound depending on its incoming direction.

For instance, a combination of the two previous examples would lead to an audio processor 401 capable of enhancing the sound approaching from behind, reflecting that such types of sound objects potentially indicate danger.

In many embodiments, the audio processor 401 may determine one or more audio components for different audio sources by applying a spectral masking to the multi-channel audio signal where the spectral masking depends on the categories detected by the audio analyzer 103. For example, the spectral masking may only be applied if a given category is detected. In other embodiments, the frequency response of a given frequency filter extracting a given audio component may be dependent on the specific category. For example, different filters may be used to extract and audio source corresponding to birdsong and an audio source corresponding to thunder.

Thus, in some embodiments, each category may be linked to a set of spectral mask properties and the audio processor may be arranged to apply a spectral mask to the multi-channel audio signal where the spectral mask is generated in response to the spectral mask properties.

In many embodiments, the filter may further be determined based on the operation of the extractor 203. For example, the time frequency tiles corresponding to a specific directional audio component may be analyzed to detect one or more frequency domains in which the directional audio component is considered to be the dominant audio source. A spectral mask filter to extract this directional audio component may then be designed to have a corresponding frequency response.

In many embodiments, the directional audio components may be generated directly by the extractor 203 or by a spatial filtering as previously described. However, in cases where each directional audio component may comprise audio corresponding to more than one audio source, these may be separated by applying a spectral filtering to the directional audio component.

In many embodiments, the audio processor 401 may be arranged to perform a process that may be referred to as audio repurposing. Audio repurposing includes changing parameters/properties of the audio scene, including removing or moving some audio sources.

In such embodiments, a spectral masking step (also called mono-channel audio source separation) may be performed to reconstruct the signals $s_k(t)$. In the case of several sources per direction, an additional spectral separation step may be performed to extract the mixed sources in the directional audio component. This spectral separation can be performed using matrix decomposition such as those described in T. Barker et T. Virtanen, "Blind Separation of Audio Mixtures Through Nonnegative Tensor Factorization of Modulation Spectrograms", IEEE/ACM Transactions on Audio, Speech, and Language Processing 24.12 (December 2016), p. 2377-2389 or N. Takahashi et Y. Mitsufuji. "Multi-Scale multi-band densenets for audio source separation", 2017 IEEE Workshop on Applications of Signal Processing to Audio and Acoustics (WASPAA). October 2017, p. 21-25.

The temporal signals can be reconstructed using a Wiener filter after such a spectral separation step. In order for the generated categories/labels to match the generated signals, the source separation step is preferably controlled by the results generated by the audio analyzer 103.

The audio repurposing may for example include applying a rendering effect to the extracted source signals (and specifically to the directional audio components) such as a gain, a reverberation, etc.

As another example, an extracted audio signal corresponding to a directional audio component can be muted or enhanced based on the associated detected category. For instance, it can be useful to enhance a ping (i.e. an audio alert alerting a teammate that an opponent was seen at a given position) in a multiplayer online battle arena (MOBA) game or the sound of a bomb about to exploded in a first person shooter game. Also, some video game sound scenes tend to be perceived to be too fuzzy (too much audio information), and therefore an advantageous effect in many applications is to remove the front of the audio scene or visible audio sources. In the latter situation, the audio-video mapping may also be estimated.

In some embodiments, the audio repurposing may include a re-spatialization of the sound sources, i.e. by resynthesizing one or more of the directional audio components at other position(s).

It will be appreciated that in many embodiments, the operation of the renderer 105 and/or the audio processor 401 may further be adapted in response to a user input provided via a suitable user interface.

The user can for instance select direction or areas where he wants the process to be applied (e.g. only rear, no front close field). This may specifically be controlled for individual categories such that different operation is achieved for different categories. It will be appreciated that many different approaches can be envisaged such as for example:

Ask a user to choose a sound source category and activate or deactivate the radar based on whether this sound is active or not.

Ask a user to choose a category and enhance or erase the specific sound.

Figure 6:
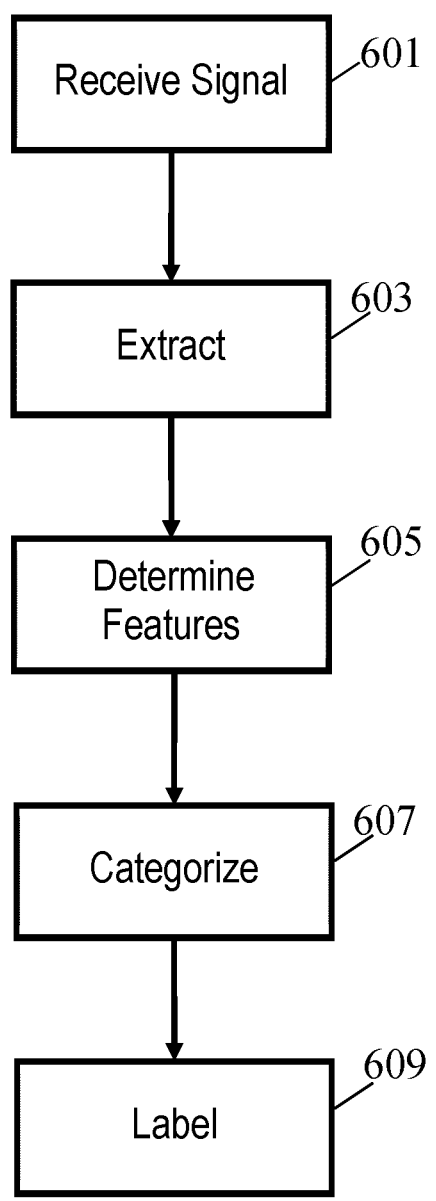
FIG. 6 illustrates an example of method in accordance with some embodiments of the invention.

FIG. 6 illustrates an example of a method of categorizing audio.

The method initiates in step 601 wherein a multi-channel audio signal representing audio for a scene is received.

Step 601 is followed by step 603 in which at least a first directional audio component is extracted by applying a spatial filtering to the multi-channel signal, the spatial filtering being dependent on the multi-channel audio signal.

Step 603 is followed by step 605 wherein a set of features is determined for the first directional audio component.

Step 605 is followed by step 607 in which a first audio source category out of a plurality of audio source categories is determined for the first directional audio component in response to the set of features.

Step 607 is followed by step 609 in which a first audio source property is assigned to the first directional audio component from a set of audio source properties for the first audio source category.

The above description has focused on using the audio source property, as well as potentially the determined features and directions, to adapt the audiovisual rendering. However, it will be appreciated that in other embodiments, the generated data may be used for other purposes.

For example, in some embodiments, the detection of a sound event and an audio source property thereof (e.g. the position in space), could be used to trigger an action, process, procedure, operation etc.

For example, a video game streamer may generate video in real time so viewers can follow the streamer's game playing. In such a scenario, it would e.g. be useful for a streamer that if an incoming character is identified based on a specific sound and/or direction, a script is triggered to add an animation to the streamer video.

An apparatus may comprise: a receiver (201) for receiving a multi-channel audio signal representing audio for a scene; an extractor (203) for extracting at least a first directional audio component by applying a spatial filtering to the multi-channel signal, the spatial filtering being dependent on the multi-channel audio signal; a feature processor (205) for determining a set of features for the first directional audio component; a categorizer (207) for determining a first audio source category out of a plurality of audio source categories for the first directional audio component in response to the set of features; and an assigner (209) for assigning a first audio source property to the first directional audio component from a set of audio source properties for the first audio source category.

For such an apparatus it may be optional that the extractor (203) comprises: a divider (301) for dividing audio channel signals of the multi-channel audio signal into a plurality of frequency interval signal components; a direction estimator (303) for determining a direction for each frequency interval signal component of the plurality of frequency interval signal components; a grouper (305) grouping frequency interval signal components into groups in response to the directions for each frequency interval signal component; and a generator (307) for generating a directional audio component by combining the frequency interval signal components of a group of frequency interval signal components.

A method may comprise: receiving a multi-channel audio signal representing audio for a scene; extracting at least a first directional audio component by applying a spatial filtering to the multi-channel signal, the spatial filtering being dependent on the multi-channel audio signal; determining a set of features for the first directional audio component; determining a first audio source category out of a plurality of audio source categories for the first directional audio component in response to the set of features; and assigning a first audio source property to the first directional audio component from a set of audio source properties for the first audio source category.

In such a method, it may be optional that the extracting comprises: dividing audio channel signals of the multi-channel audio signal into a plurality of frequency interval signal components; determining a direction for each frequency interval signal component of the plurality of frequency interval signal components; grouping frequency interval signal components into groups in response to the directions for each frequency interval signal component; and generating a directional audio component by combining the frequency interval signal components of a group of frequency interval signal components.

The apparatus and method of such an approach may use other approaches for extracting.

The invention can be implemented using hardware, software, firmware, or any combination of these, or indeed in any suitable way. The individual features and functional entities may be physically, functionally and logically implemented in any suitable way, including a single unit, in a plurality of units, or using distributed processing.

Individual features included in different claims may possibly be advantageously combined, and the inclusion in different claims does not imply that such a combination of features is not feasible and/or advantageous. Also, the inclusion of a feature in one category of claims does not imply a limitation to this category but rather indicates that the feature is equally applicable to other claim categories as appropriate. The order of features in the claims does not imply any specific order in which the features must be worked and in particular the order of individual steps in a method claim does not imply that the steps must be performed in this order. Singular references do not exclude a plurality. Thus, references to "a", "an", "first", "second" etc. do not preclude a plurality. References to "first", "second" etc. do not imply any specific ordering, sequence or relationship between the corresponding features but are merely to be interpreted as labels. Reference signs in the claims are provided merely as a clarifying example and do not limit the scope of the claims.

The invention is not limited to the specific form set forth herein and the scope of the present invention is limited only by the accompanying claims. Additionally, although a feature may appear to be described in connection with particular embodiments, the features may be combined with features of other embodiments as appropriate. In the claims, the term comprising does not express any limitation to only these features and does not exclude the presence of other features.

The invention claimed is:

1. An apparatus comprising:
a receiver for receiving a multi-channel audio signal representing audio for a scene;
an extractor for extracting at least a first directional audio component by applying a spatial filtering to the multi-channel signal, the spatial filtering being dependent on the multi-channel audio signal;
a feature processor for determining a set of features for the first directional audio component;
a categorizer for determining a first audio source category out of a plurality of audio source categories for the first directional audio component in response to the set of features, each audio source category of the plurality of audio source categories being linked to a set of one or more audio source properties; and
an assigner for assigning a first audio source property to the first directional audio component from a set of one or more audio source properties linked to the first audio source category, wherein the extractor comprises:
a divider for dividing audio channel signals of the multi-channel audio signal into a plurality of frequency interval signal components;
a direction estimator for determining a direction for each frequency interval signal component of the plurality of frequency interval signal components;
a grouper grouping frequency interval signal components into groups in response to the directions for each frequency interval signal component; and
a generator for generating the first directional audio component by combining the frequency interval signal components of a group of frequency interval signal components,
wherein the apparatus further comprises an image generator for generating an image of the scene; and wherein the image generator is arranged to include a graphic element in the image, a property of the graphic element being dependent on the first audio source property, and
the apparatus further comprises an audio processor for generating an output audio signal from the multi-channel audio signal, the audio processor being arranged to adapt a processing of the multi-channel audio signal in response to the first audio source property.

2. The apparatus of claim 1, wherein the extractor is arranged to generate a direction estimate for the first directional audio component and the image generator is arranged to determine a position in the image for the graphic element in response to the direction estimate for the first directional audio component.

3. The apparatus of claim 1, wherein the extractor is arranged to generate a direction estimate for the first directional audio component and a property of the graphic element is dependent on the direction estimate for the first directional audio component.

4. The apparatus of claim 1, wherein the graphic element is dependent on at least one feature of the set of features.

5. The apparatus of claim 1, wherein the audio processor is arranged to adapt at least one of an amplitude and a position of the first directional audio component in the output audio signal in response to the first audio source property.

6. The apparatus of claim 1, wherein the audio processor is arranged to determine a plurality of audio components by applying a spectral masking to the multi-channel audio signal, the spectral masking being dependent on the first audio source property, the output audio signal comprising at least one audio component of the plurality of components.

7. The apparatus of claim 1, wherein the extractor is arranged to generate a direction estimate for the first directional audio component and the audio processor is arranged to adapt a processing of the multi-channel audio signal in response to the direction estimate for the first directional audio component.

8. The apparatus of claim 1, wherein the audio processor is arranged to adapt a processing of the multi-channel audio signal in response to at least one feature of the set of features.

9. The apparatus of claim 1, wherein the assigner is arranged to determine a second audio source property for the first directional audio component from the set of audio source properties for the first audio source category, the second audio source property being for a different audio source than the first audio source property.

10. The apparatus of claim 1, wherein the categorizer is arranged to determine a second audio source category out of the plurality of audio source categories for the first directional audio component in response to the set of features; and
the assigner is arranged to determine a second audio source property for the first directional audio component from a set of audio source properties for the second audio source category.

11. The apparatus of claim 1, wherein the extractor is arranged to generate a direction estimate for the first directional audio component, and the apparatus further comprises a data processor for generating characterization data for the first directional audio component, the characterization data comprising data indicative of the first audio source property, the direction estimate for the first directional audio component, and at least one feature of the set of features.

12. A method comprising:
receiving a multi-channel audio signal representing audio for a scene;
extracting at least a first directional audio component by applying a spatial filtering to the multi-channel signal, the spatial filtering being dependent on the multi-channel audio signal;
determining a set of features for the first directional audio component;
determining a first audio source category out of a plurality of audio source categories for the first directional audio component in response to the set of features, each audio source category of the plurality of audio source categories being linked to a set of one or more audio source properties; and
assigning a first audio source property to the first directional audio component from a set of one or more audio source properties linked to the first audio source category; wherein the extracting comprises:
dividing audio channel signals of the multi-channel audio signal into a plurality of frequency interval signal components;
determining a direction for each frequency interval signal component of the plurality of frequency interval signal components;
grouping frequency interval signal components into groups in response to the directions for each frequency interval signal component; and
generating the first directional audio component by combining the frequency interval signal components of a group of frequency interval signal components,
generating an output audio signal from the multi-channel audio signal, by an audio processor arranged to adapt a processing of the multi-channel audio signal in response to the first audio source property, and
generating an image of the scene by an image generator arranged to include a graphic element in the image, a property of the graphic element being dependent on the first audio source property.

13. A non-transitory computer readable medium storing a computer program product comprising instructions which, when the program is executed by a computer, cause the computer to carry out the method of claim 12.

* * * * *